(No Model.)

S. M. FENTON.
DISH WASHER.

No. 325,792. Patented Sept. 8, 1885.

Witnesses
Geo. H. Strong
J. H. Rouse

Inventor,
Sally M. Fenton.
By Dewey & Co.
Attorneys

UNITED STATES PATENT OFFICE.

SALLY M. FENTON, OF SALINAS, CALIFORNIA.

DISH-WASHER.

SPECIFICATION forming part of Letters Patent No. 325,792, dated September 8, 1885.

Application filed February 18, 1885. (No model.)

*To all whom it may concern:*

Be it known that I, SALLY M. FENTON, of Salinas, county of Monterey, and State of California, have invented an Improvement in Dish-Washers; and I hereby declare the following to be a full, clear, and exact description thereof.

My invention relates to a new and useful dish-washer; and it consists in the combination of devices which I shall hereinafter fully explain and claim.

The object of my invention is to provide a means for firmly holding the dish-cloth when in use, and for wringing it effectively and conveniently.

Figure 2:
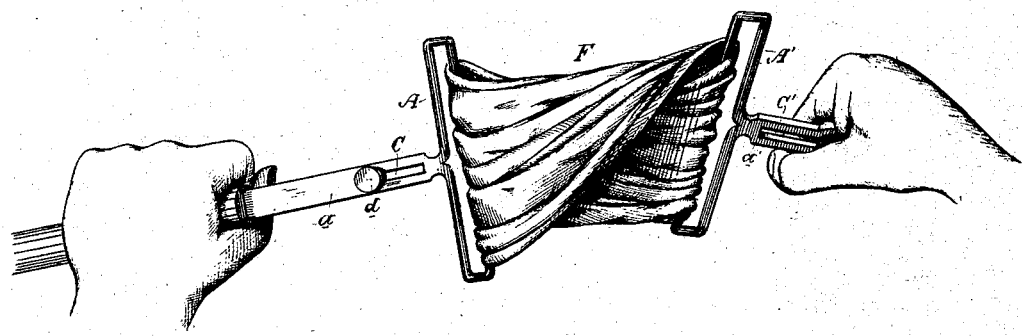
Figure 1:
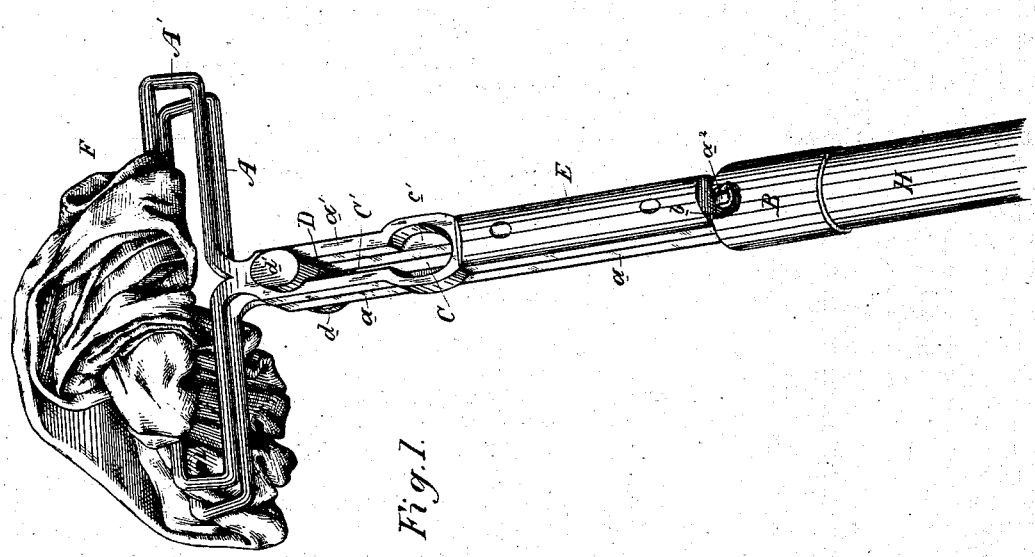

Referring to the accompanying drawings, Figure 1 is a perspective view of my dish-washer, showing it closed and ready for use. Fig. 2 is a perspective view showing the two loops separated to extend the cloth and in the act of being twisted to wring it.

A is the fixed cross-head loop, having a shank, $a$, terminating in a socket, B, into which the handle H is inserted.

A′ is the removable cross-head loop, having shank $a'$. The shanks of the two loops are flat and lie against each other, while the loops themselves are preferably bent apart slightly to allow for the thickness of the cloth which passes between them.

In the forward end of the socket B is made a small hole, $b$, and on the end of the shank $a'$ of loop A′ is made a small curved hook or lug, $a^2$, which, when the said shank is inclined away from the other shank, $a$, is adapted to enter the hole $b$, and to securely engage it when the shanks are brought to parallel planes.

In the shank $a$ is made an elongated slot, C, in which a sliding stud, D, fits. This stud is provided with a head, $d$, on one end by which it is confined in slot C, and with a head, $d'$, on its other end.

In the shank $a'$ is made an elongated slot, C′, terminating at one end in an enlarged opening, $c'$, which is adapted to fit over the head $d'$ of the stud D. Then by moving the stud toward the loops the two shanks are firmly secured together. Upon the shank $a'$ is fitted and secured a small handle, E, of wood, to enable the operator to obtain a better grasp in the operation of wringing.

F is the dish-cloth. This is passed through both loops, and then its ends are sewed together, forming of it an endless band, which is confined by the loops.

In Fig. 1 it will be seen the device is ready for use, the cloth being held in the loops. When the work is done and the cloth needs wringing, the stud D is slipped back until its head $d'$ comes into relation with the enlarged opening $c'$, when the shank $a'$ is slipped over it and away from the shank $a$. As this separation continues the hook $a^2$ becomes disengaged from the hole $b$ and the loop A′ is then free. The operator then separates the two loops to the full extent of the dish-cloth, as shown in Fig. 2, and grasping the long handle H in one hand and the handled shank $a'$ in the other the two are twisted, thus wringing the cloth, which is very effectively done by reason of the great purchase obtained.

The cloth itself has not to be handled.

When the device is to be used again, the shank $a'$ is brought back to its place and secured as before.

The device is as applicable for a mop as for a dish-washer.

Having thus described my invention, what I claim as new, and desire to secure by Letters Patent, is—

1. The loop A, having slotted shank $a$, and a socket, B, with a hole, $b$, and the handle H, fitted in said socket, in combination with the removable loop A′, having shank $a'$, with a hook or lug, $a^2$, adapted to engage the hole $b$, and a slot, C′, having an enlarged opening, $c'$, and the sliding stud D with heads $d$ $d'$, whereby the two shanks are secured together, substantially as and for the purpose herein described.

2. The dish-washer herein described, consisting of the loop A, having slotted shank $a$, and a socket, B, with a hole, $b$, the handle H, fitting said socket, the removable loop A′, having shank $a'$, with a hook or lug, $a^2$, adapted to engage the hole $b$, and a slot, C′, having an enlarged opening, $c'$, the sliding double-headed stud D, joining the shanks through their slots, and the endless dish-cloth F, fitted in both loops, substantially as herein described.

In witness whereof I have hereunto set my hand.

SALLY M. FENTON.

Witnesses:
W. M. R. PARKER,
T. H. BOUTON.